(12) United States Patent
Nonaka et al.

(10) Patent No.: US 6,974,784 B1
(45) Date of Patent: Dec. 13, 2005

(54) SHEET-FORM PHOTOCURABLE MATERIAL

(75) Inventors: Shinichi Nonaka, Osaka (JP); Shigeru Motomiya, Osaka (JP)

(73) Assignee: Dainippon Ink and Chemicals, Inc., Tokyo (JP)

( * ) Notice: Subject to any disclaimer, the term of this patent is extended or adjusted under 35 U.S.C. 154(b) by 0 days.

(21) Appl. No.: 09/926,160

(22) PCT Filed: Mar. 16, 2000

(86) PCT No.: PCT/JP00/01604

§ 371 (c)(1),
(2), (4) Date: Dec. 14, 2001

(87) PCT Pub. No.: WO00/55239

PCT Pub. Date: Sep. 21, 2000

(30) Foreign Application Priority Data

Mar. 16, 1999 (JP) ................................ 11-071023

(51) Int. Cl.[7] ......................... D03D 15/00; B32B 27/12
(52) U.S. Cl. ..................... 442/181; 442/286; 442/287; 522/95; 522/96; 522/243; 522/329.5; 522/329.7
(58) Field of Search ............................... 442/181, 286, 442/287; 522/95, 96; 525/243, 329.5, 329.7

(56) References Cited

U.S. PATENT DOCUMENTS

| 5,747,553 A | * | 5/1998 | Guzauskas | 523/115 |
| 5,847,036 A | * | 12/1998 | Takabatake et al. | 524/321 |
| 6,316,089 B1 | * | 11/2001 | Ohtani et al. | 428/300.7 |
| 6,652,694 B1 | * | 11/2003 | Nonaka et al. | 156/182 |

FOREIGN PATENT DOCUMENTS

| JP | 53-102953 | 9/1978 |
| JP | 54-78787 | 6/1979 |
| JP | 54-143493 | 11/1979 |
| JP | 56-139535 | 10/1981 |
| JP | 57-111322 | 7/1982 |
| JP | 60-123538 | 7/1985 |
| JP | 63-186744 | 8/1988 |
| JP | 3-106942 | 5/1991 |
| JP | 03106942 A | * 5/1991 | ............ C08J 5/24 |
| JP | 5-1123 | 1/1993 |
| JP | 5-32720 | 2/1993 |
| JP | 5-171022 | 7/1993 |
| JP | 6-298883 | 10/1994 |
| JP | 6-313019 | 11/1994 |
| JP | 7-188505 | 7/1995 |
| JP | 8-225705 | 9/1996 |
| JP | 8-323860 | 12/1996 |
| JP | 9-95519 | 4/1997 |
| JP | 9-174698 | 7/1997 |
| JP | 9-174781 | 7/1997 |
| JP | 9-176331 | 7/1997 |
| JP | 10-67906 | 3/1998 |
| JP | 10-265639 | 10/1998 |
| JP | 10-279765 | 10/1998 |
| JP | 10-287716 | 10/1998 |

OTHER PUBLICATIONS

Polymer Handbook, Brandrup J. et al.; ed., 4th ed., Interscience, New York, 1999, pp. VII/682-VII/689.

Yoshida S.; Matumoto, Y. "Development of low viscosity paste vinyl chloride wallpaper grade", *TOSOH Research & Technology Review.* vol. 46, 41-44 (2002).

* cited by examiner

*Primary Examiner*—Glenn Caldarola
*Assistant Examiner*—Alexis Wachtel
(74) *Attorney, Agent, or Firm*—Armstrong, Kratz, Quintos, Hanson & Brooks, LLP

(57) ABSTRACT

A photocurable sheet-form material which comprises (a) a polymerizable unsaturated monomer, (b) a polymer which is either polymethyl methacrylate or a high-molecular polymer consisting mainly methyl methacrylate units and which is compatible or swollen with the polymer (a), (c) a photocuring agent, and (d) a fibrous reinforcement. It is excellent in productivity, handleability, and photocurability. This photocurable sheet-form material is usable for producing a layered molding and forming a backup layer (reinforcing layers) of a molded article, and is a useful material as a replacement protective material for pipes, covering material, lining material, fixing material, or the like.

4 Claims, No Drawings

SHEET-FORM PHOTOCURABLE MATERIAL

TECHNICAL FIELD

The present invention relates to a sheet-form material, which can be cured by irradiation with ultraviolet rays or visible light and which is excellent in productivity, handleability, and photocurability, relates to a layered molding, and relates to a method for reinforcement.

The present invention is based on Japanese Patent Application No. Hei 11-71023, the content of which is incorporated herein by reference.

BACKGROUND ART

In the past, in order to prepare a sheet-form material, a resin composition was cured to the B stage by increasing the viscosity thereof. For curing it to the B stage, various methods in which a metal oxide such as magnesium oxide is used as a viscosity improver, in which the viscosity is increased by isocyanate, a photopolymerization initiator causing partial polymerization, or a crystalized polyester, are known.

1) Specific examples of photocurable materials are disclosed in Japanese Unexamined Patent Application, First Publication No. Sho 63-186744, and Japanese Unexamined Patent Application, First Publication No. Hei 3-106942, in which magnesium oxide is used.

2) A sheet-form material in which isocyanate is used is disclosed in, for example, Japanese Unexamined Patent Application, First Publication No. Sho 60-123538.

3) Specific examples of methods of forming into sheets by partial photopolymerization by ultraviolet irradiation are disclosed in Japanese Examined Patent Application, Second Publication No. Sho 58-21927; Japanese Unexamined Patent Application, First Publication No. Sho 56-139535; and Japanese Unexamined Patent Application, First Publication No. Sho 57-111322.

4) Specific examples of methods of increasing the viscosity by using crystalized polyesters are disclosed in Japanese Unexamined Patent Application, First Publication No. Sho 58-67709, and Japanese Unexamined Patent Application, First Publication No. Hei 5-1123.

5) Specific examples of viscosity improvers containing fine acrylic resin powders which have recently been researched, although they are not photocurable materials, include viscosity improvers containing fine acrylic powders of unsaturated polyester resins disclosed in, for example, Japanese Unexamined Patent Application, First Publication No. Hei 5-171022; Japanese Unexamined Patent Application, First Publication No. Hei 9-95519; Japanese Unexamined Patent Application, First Publication No. Hei 9-174698; Japanese Unexamined Patent Application, First Publication No. Hei 9-174781; Japanese Unexamined Patent Application, First Publication No. Hei 9-176331. Specific examples of acrylic resins are disclosed in, for example, Japanese Unexamined Patent Application, First Publication No. Hei 5-32720; Japanese Unexamined Patent Application, First Publication No. Hei 5-171022; Japanese Unexamined Patent Application, First Publication No. Hei 6-298883; Japanese Unexamined Patent Application, First Publication No. Hei 6-313019; Japanese Unexamined Patent Application, First Publication No. Hei 7-188505; Japanese Unexamined Patent Application, First Publication No. Hei 8-225705; Japanese Unexamined Patent Application, First Publication No. Hei 10-67906; Japanese Unexamined Patent Application, First Publication No. Hei 10-265639; Japanese Unexamined Patent Application, First Publication No. Hei 10-279765; Japanese Unexamined Patent Application, First Publication No. Hei 10-287716.

These are used for the purpose of improving handleability, formability, low contractility, preventablity of cracks in molding, appearance, stability of viscosity increase, and kneading properties.

In accordance with the conventional methods of increasing the viscosity, when metal oxide is used, for example, metal oxide is usually used in a dispersed form because metal oxide is barely dissolved in styrene, acrylic monomer, or the like. Therefore, a resin composition becomes cloudy, and lacks transparency, and it is inferior in photocurability as a photocurable material. Moreover, since a reactive OH group or COOH group is required in a polymer component to increase the viscosity, metal oxide cannot be applied to resins not having COOH groups such as vinyl ester or the like. Since the efficiency of the viscosity increase is suppressed by water, it is difficult to control the viscosity increase to produce stable sheet-form materials.

When isocyanate is used to increase the viscosity, although it has high solubility, the efficiency of the viscosity increase is more suppressed by water than metal oxide, so it is difficult to control the increase in the viscosity. Moreover, if isocyanate remains in a sheet-form material, it tends to cause irritation to the skin, so that it is not superior in handleability.

When the viscosity is increased by photopolymerization, since light is used for final curing, it is difficult to control the degrees to which the viscosity will increase and what the hardness will be, and the result tends to lack preservation stability.

When acrylic resin powders disclosed Japanese Unexamined Patent Application, First Publication No. Hei 5-171022, for example, are used to increase the viscosity, an obtained sheet-form material becomes cloudy in portions where the acrylic resin powders remain insoluble, and the transparency of the sheet-form material is inferior, so that the photocuring efficiency is decreased.

DISCLOSURE OF INVENTION

An object of the present invention is to provide a sheet-form material in which various monomers can be used as reactive diluents and in which the viscosity thereof increases rapidly, and which is excellent in handleability and photocurability.

The present inventors have carried out intensive research concerning these problems, resulting the completion of the present invention.

That is, the present invention provides a photocurable sheet-form material comprising (a) a polymerizable unsaturated monomer, (b) a polymer which is either polymethyl methacrylate or a high-molecular polymer consisting mainly of methyl methacrylate units and which is compatible or swollen with the polymer (a), (c) a photocuring agent, and (d) a fibrous reinforcement.

Preferably, the high molecular weight polymer (b) has a weight average molecular weight of 100,000 or more and can be obtained in a powdered form.

The polymerizable unsaturated monomer (a) is an acrylic type polymerizable monomer, and has a solubility parameter (which is abbreviated to "SP" hereinafter) of 8.1 to 10.0, which is calculated in accordance with the formula "SP=Σ(G)/molecular weight" using data of molar attraction constants G as given in Table 1 and 2 below.

The photocurable sheet-form material according to the present invention preferably includes one or more resins (e) selected from (meth)acrylic type polymers, unsaturated polyesters, vinyl esters, or urethane acrylates.

The content of polymer (b) is preferably within a range from 1 to 100 parts by weight relative to 100 parts by weight of the polymerizable unsaturated monomer (a).

Moreover, the present invention provides a layered molding which is made of a laminate of a thermoplastic resin sheet and the photocurable sheet-form material, and a method of reinforcement which includes a step of using the photocurable sheet-form material on a surface of a molded article.

BEST MODE FOR CARRYING OUT THE INVENTION

Next, the present invention will be explained in detail.

A solubility parameter (SP value) of a polymerizable monomer (a) of the present invention is a calculated value of an individual polymerizable monomer (a) or of a mixture of polymerizable monomers (a), which is calculated in accordance with Formula 1 using molar attraction constants G as given in Table 1 and 2 below. A specific example of calculation of the value will be described in the following.

Formula 1

$$SP = \Sigma(G)/\text{molecular weight}$$

TABLE 1

Molar Attraction Constants G

| Group | G | Group | G |
|---|---|---|---|
| $CH_3$— | 148.3 | —OH→ | 225.84 |
| —$CH_2$— | 131.5 | Acidic dimer —H | −50.47 |
| >CH— | 85.99 | Aromatic OH | 170.99 |
| >C< | 32.03 | $NH_2$— | 226.56 |
| $CH_2$= | 126.54 | —NH— | 180.03 |
| —CH= | 121.53 | —N< | 61.08 |
| >C= | 84.51 | —CN | 354.56 |
| Aromatic-CH= | 117.12 | —NCO | 358.66 |
| Aromatic>C— | 98.12 | —S— | 209.42 |
| Ether, Acetal —O— | 114.98 | $Cl_2$ | 342.67 |
| Epoxide —O— | 176.20 | First Cl | 205.06 |
| —COO— | 326.58 | Second Cl | 208.27 |
| >C=O | 262.96 | Aromatic Cl | 161.0 |
| —CHO | 292.64 | Br | 257.88 |
| (—CO)$_2$O | 567.29 | Aromatic Br | 205.60 |
|  |  | F | 41.33 |

TABLE 2

G Based on Structural Form

| Group | G | Group | G |
|---|---|---|---|
| Conjugate | 23.26 | Five membered ring | 20.09 |
| Cis | −7.13 | Six membered ring | −23.44 |
| Trans | −13.50 | Ortho substitution | 9.69 |
| Four membered ring | 77.76 | Meta substitution | 6.6 |
|  |  | Para substitution | 40.33 |

Example of calculation of SP value

In the case of methyl methacrylate (MMA) represented by the following chemical formula:

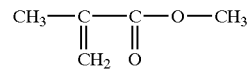

SP can be calculated by dividing $\Sigma(G)$ by a molecular weight as follows.

$\Sigma G(MMA) = 148.3 \times 2$ $\quad ((CH_3-) \times 2)+126.54 \times 1$
$((CH_2=) \times 1)+84.51 \times 1((>C=) \times 1)+326.58 \times 1$
$((-COO-) \times 1)=834.23$ Accordingly, the SP value can be obtained by dividing $\Sigma G(MMA)$ by the molecular weight as follows.

$SP = \Sigma G(MMA)/\text{molecular weight} = 834.23/100 = 8.34$

In the case of a mixture:
SP(MMA)=8.34
SP(NPGDMA)=8.18
SP(IBMA)=7.93

When the mixing ratio of MMA/NPGDMA/IBMA is 100/50/50, the SP value can be obtained by the following formula.

$SP(\text{mixture}) = 8.34 \times (100/200) + 8.18 \times (50/200) + 7.93 \times (50/200) = 8.20$ In the present invention, it is important that the SP value of the polymerizable monomer (a) be within a range from 8.1 to 10.0. If the SP value is out of this range, the viscosity of the yielded material cannot be sufficiently increased.

A methacrylate or an acrylate (such as methyl, ethyl, propyl, n-, iso-, or tert-butyl, 2-ethylhexyl, dodecyl, tridecyl, or stearyl, methacrylate or acrylate, or a methacrylate or an acrylate having at least one aliphatic alcohol group) can be used as the polymerizable monomer (a).

Moreover, a vinyl ester such as vinyl acetate, vinyl pivalate, vinyl neononanoate, vinyl neodecanoate, vinyl laurate, or vinyl stearate, can also be used.

Dimethyl maleate, diethyl maleate, dibutyl maleate, dicyclohexyl maleate, fumarate having a similar residue, or the like, can be used as an α, β-unsaturated diester.

Moreover, a vinyl aromatic compound such as styrene, vinyl toluene, 4-t-butyl styrene, or the like, can also be used.

Multifunctional polymerizable monomers can be used together, for example, ethylene glycol, 1,2- and 1,3-propylene glycol, 1,3- and 1,4-butanediol, 1,6-hexanediol, neopentyl glycol, trimethylol propane, pentaerythritol, an ester of OH-terminal polyether (such as polyethylene glycol, polypropylene glycol, polytetramethylene glycol, or the like) acrylate or methacrylate, or an aromatic type monomer such as divinyl benzene.

Other preferable examples of the multifunctional polymerizable monomers include products produced by reaction of hydroxyalkyl acrylate and/or hydroxyalkyl methacrylate with di- or polyglycidyl ether, dicarboxylate, oligoester, polyester, or polyurethan prepolymer having a functional di- or triisocyanate, isocyanate group, and products produced by reaction of an acrylate or a methacrylate with di- or polyglycidyl ether.

Among these, provided that the SP calculated from the molar attraction constants G is within a range from 8.1 to 10.0, the polymerizable monomer (a) can be individually used. Moreover, even when the SP is below 8.1 or the SP is over 10.0, a mixture including two or more the polymerizable monomers (a) can also be used, provided that the sum of the product of the weight ratio of each monomer and the SP is within a range from 8.1 to 10.0.

A polymer (b) can be produced in a powdered form of a polymer mainly containing polymethyl methacrylate or methyl methacrylate, preferably having a weight average molecular weight of 100,000 or more, more preferably within a range from 100,000 to 3,000,000. The polymer (b) acts as a viscosity improver by slowly melting into the polymerizable monomer (a) in a material according to the present invention.

Specific examples of acrylates and methacrylates as monomers constituting the polymer (b) include ethyl (meth) acrylate, n-butyl (meth)acrylate, methyl methacrylate, butyl (meth)acrylate, n-propyl (meth)acrylate, 2-ethylhexyl (meth)acrylate, n-decyl methacrylate, isobutyl (meth)acrylate, n-amyl (meth)acrylate, isoamyl (meth)acrylate, n-hexyl (meth)acrylate, n-octyl (meth)acrylate, 2-hydroxy ethyl (meth)acrylate, and the like. Specific examples of diene type monomers include conjugated diene type compounds such as butadiene, isoprene, 1,3-pentadiene, cyclopentadiene, dicyclopentadiene, and the like, and unconjugated diene type compounds such as 1,4-hexadiene, ethylidene norbornene, and the like.

Specific examples of monomers which can copolymerize with these include aromatic vinyl compounds such as styrene, α-methyl styrene, vinyl toluene, p-t-butyl styrene, chlorostyrene, and the like, acrylamide type compounds such as acrylamide, N-methylol acrylamide, N-butoxy methyl acrylamide, and the like, methacrylamide type compounds such as methacrylamide, N-methylol methacrylamide, N-butoxymethyl methacrylamide, and the like, and allylglycidyl acrylates such as glycidyl acrylate, glycidyl methacrylate, and the like.

As the polymer (b), cross-linked monomers having at least two radical polymerizable double bonds can be used together with acrylate type or methacrylate type monomers. Specific examples of the cross-linked monomers include di(meth)acrylates such as ethyleneglycol diacrylate, butyleneglycol diacrylate, trimethylolpropane diacrylate, trimethylolpropane triacrylate, hexanediol diacrylate, oligoethylene diacrylate, ethyleneglycol dimethacrylate, butyleneglycol dimethacrylate, trimethylolpropane dimethacrylate, trimethylolpropane trimethacrylate, hexanediol dimethacrylate, oligoethylene dimethacrylate, and the like; aromatic divinyl monomers such as divinyl benzene and the like, triallyl trimellitate, triallyl isocyanurate, and the like. The content of the cross-linked monomer is not over 0.5% by weight in the copolymer. This is because if the degree of crosslinking is too high, which prevents swelling into a matrix resin, the transparency of the sheet is decreased, resulting in decrease of the photocuring efficiency.

Although methods of preparing the polymer (b) are not limited, the polymer (b) is usually produced in an emulsion form by an emulsion polymerization method. That is, emulsion polymerization is carried out by using monomers of components, a peroxidation initiator as a photopolymerization initiator, and a radical photopolymerization initiator such as a redox initiator or the like, in the presence of an emulsifying agent, so as to obtain emulsions. According to the emulsion polymerization, emulsions including a particulate polymer preferably having a particle diameter of 300 to 5000 Angstroms.

The polymer (b) can usually be produced in a powdered form by spraying emulsions made from a copolymer prepared by an emulsion polymerization method by means of a spray such as a multibladed rotary disk type, an orbicular rotary disk type, nozzle type, or the like, and then drying the sprayed emulsions. In this drying, the emulsions are usually aggregated in each spray liquid unit, preferably to form aggregated particles each having a particle diameter within a range from 20 to 100 μm. The degree of aggregation depends on the drying conditions. After drying, the dried emulsions can be crushed and loosened. After emulsion polymerization, latexe particles can be solidified and be separated by salting-out or freezing, followed by dehydration to produce a wet cake, which is dried on a fluid bed or the like, so as to obtain aggregated particles.

The content of the polymer (b) is preferably within a range from 1 to 100 parts by weight, more preferably 10 to 50 parts by weight, relative to 100 parts by weight of the monomer (a) or the mixture of the monomers (a). When the content of the polymer (b) is less than 1 part by weight, the degree of the viscosity increase is insufficient, which causes a problem in treatment such as stickiness or the like. When the content of the polymer (b) is more than 100 parts by weight, the viscosity becomes too high to knead it immediately after addition, and even when it can be kneaded, the polymer remains as insoluble matter, which causes problems in which the flexural strength or the impact strength of the photocured molding is reduced, and the obtained sheet lacks the transparency.

The polymer (b) is required to be solidified during and immediately after mixing by stirring after addition, as well as to be dissolved and be swollen. The rate of the viscosity increase is required to be 1,000 poise or less at 25° C. within 5 minutes from mixing by stirring. When the rate is over 1,000 poise at a step of impregnating the polymer (b) into the fibrous reinforcement (d) which is one of the components, the adhesive strength at the interface therebetween is insufficient, and the strength is reduced. Furthermore, vacant spaces remain in the interface, so the whole becomes clouded, and the transmittance of light is significantly decreased, and thereby the rate of photocuring the photocurable sheet-form material according to the present invention is significantly delayed.

In ddition to the conditions described above, the viscosity of the polymer left at 25° C. is required to reach over 1,000 poise within 24 hours. That is because the content or the unit weight of the fibrous reinforcement (d) cannot be controlled when the polymer impregnated into the fibrous reinforcement (d) is stored in a sheet form, and thereby the desired properties cannot be obtained.

The photocuring agent (c) is a compound which can generate radicals by being decomposed by light having a specific wavelength within a range from an ultraviolet region to a visible region. Specific examples of the compounds include organic compounds classified into diacetyl, benzophenone, benzoin, benzyl, benzoin ether, acetophenone, diethoxy acetophenone, dichlorophenoxy acetophenone, hydroxyl isobutyl ketone, benzyl dimethyl ketal, chlorothioxanthene, ethyl anthraquinone, benzophenone, thioxantone, ketal, onium salt, or the like, and mixtures thereof, in which a coenzyme such as an amine or the like can be mixed as necessary. The content of the photocuring agent (c) added is preferably within a range from 0.001 to 1% by weight, more preferably within a range from 0.01 to 0.5% by weight, relative to the total weight of the monomer (a) and the polymer (b).

The fibrous reinforcement (d) may be that which is usually used as a fibrous reinforcement, and examples thereof include glass fibers, polyester fibers, phenol fibers, polyvinyl alcohol fibers, aromatic polyamide fibers, nylon fibers, and carbon fibers. They can have forms including, for example, chopped strands, chopped strand mats, roving, and woven fabrics. The fibrous reinforcement is selected considering the viscosity of the resin composition and strength of the resulting molded article. The amount of the fibrous reinforcement (d) used is preferably within a range from 10 to 100% by weight, relative to 100 parts by weight of the total weight of the monomer (a) and the polymer (b).

In the present invention, a radical-curable polymer resin (e) is preferably further added considering the properties of molded articles. Specific examples of the polymer resin (e) include unsaturated polyesters, vinyl ester resins, urethane (meth)acrylate resins, (meth)acrylic polymers, and the like. These resins (e) usually include the polymerizable unsaturated monomer (a), and the mixing ratio of polymer resin to polymerizable monomer is preferably within a range from 30 to 80% by weight to 70 to 20% by weight. The content of the resisn (e) is preferably within a range from 0 to 80 parts by weight, relative to 100 parts by weight of the total weight of the monomer (a) and the polymer powders (b), provided that the SP value is within a range from 8.1 to 10.

The unsaturated polyester according to the present invention can be preferably prepared by condensation reaction between a dibasic acid including α, β-unsaturated dibasic acid and a polyhydric alcohol, and a dicyclopentadiene type compound as necessary, and a monobasic acid, a monohydric alcohol, a monoepoxy compound, and/or the like can be used as necesarry. The number average molecular weight of the unsaturated polyester is preferably within a range from 500 to 5,000.

The vinyl ester resin according to the present invention is an unsaturated polyester (meth)acrylate prepared by reacting a (meth)acrylic compound with the end terminal of the unsaturated polyester, which may be called an unsaturated polyester (meth)acrylate.

Moreover, the vinyl ester resin according to the present invention can be produced, by reacting an individual of a bisphenol type epoxy resin or reacting a mixed resin including a bisphenol type epoxy resin and a novolak type epoxy resin with an unsaturated monobasic acid in the presence of an esterification catalyst, which may be called an epoxy (meth) acrylate resin.

The urethane (meth) acrylate resin according to the present invention can be prepared by preferably reacting polyisocyanate with a polyol such as polyetherpolyol, polyesterpolyol, polybutadienepolyol, or the like, and also with a hydroxyalkyl (meth)acrylate compound, specifically can be prepared by reacting polyisocyanate, which is produced by reacting polypropylene glycol with tolylenediisocyanate (TDI) at a molar ratio of 1 to 2, with 2-hydroxyethyl methacrylate at a molar ratio of 1 to 2.

The constitutional ratio of the polymerizable unsaturated monomer (a) to the polymer (b) according to the present invention is preferably within a range from 95 to 10% by weight to 5 to 90% by weight, more preferably 95 to 50% by weight to 5 to 50% by weight. The content of the photocuring agent (c) is preferably within a range from 0.001 to 1% by weight, relative to the total weight of (a) and (b). The content of the fibrous reinforcement (d) is preferably within a range from 10 to 100 parts by weight, relative to 100 parts by weight of (a) and (b). The content of polymer resin (e) is preferably within a range from 0 to 80 parts by weight, relative to 100 parts by weight of (a) and (b).

When the viscosity of the composition is high, an agent for decreasing the viscosity can be used. Provided that the agent can reduce the viscosity of the composition, there is no other limitation imposed on the agent for decreasing the viscosity. Specific examples of an agent for decreasing viscosity include saturated polyester type compounds, BYK (manufactured by BYK Chemie GmbH; product names W900, W905, W960, W965, W980, W990, W995, W996, W9010), and the like.

Among these agents for decreasing the viscosity, one can be used, or two or more can be used in a mixture.

According to a method of preparing the photocurable sheet-form material of the present invention, into the polymerizable unsaturated monomer (a) or a mixture of the monomers (a), of which SP is within a range from 8.1 to 10.0 at ordinary temperature, the photocuring agent (c) is added, is mixed, and is dissolved by stirring by means of a conventional mixer, such as a planetary mixer, a kneader, or the like. Finally, the polymer (b) including polymethyl methacrylate or methyl methacrylate as a main component is added in a powdered form as a viscosity improver, and is mixed by stirring to produce a compound.

The compound produced by this mixer is applied onto one or two of two releasing films (or light blocking releasing films) at a certain thickness, preferably 0.3 to 5 mm, by means of a curtain flow coater or a doctor knife, preferably on which the fibrous reinforcements (d) cut by a chopper are distributed, or alternatively, between which a chopped strand mat is disposed. Then, the surfaces of the releasing film applied by the compound are stuck together, preferably followed by rolling by means of a rolling mill, so as to obtain a sheet-form material preferably having a thickenss of 0.5 to 7 mm. When the releasing film cannot block light, the resulting material must be stored in a black box, or alternatively, must be coated on both surfaces with light blocking films. Finally, the material is taken up by means of a roller or is folded up with coatings of releasing films on both surfaces. When a SMC machine is not used, the mixture described above may be impregnated into the chopped strand mat by means of a roller or the like.

In a step of increasing the viscosity, although the temperature is determined in accordance with the kind and the amount of the polymer (b) as a viscosity improver, the step is usually carried out at ordinary temperature (25° C.) for one hour, and then by heating to 45° C. for approximately 30 minutes. The releasing properties of the releasing films of the resulting photocurable sheet-form material are sufficient.

A method of using the sheet-form material according to the present invention includes removing the light blocking films and/or releasing films of the material at outdoors, indoors, etc., forming it in accordance with the form of a covering material, and allowing it to stand for about 1 to 3 hours, and thereby a molding or a material can be coated by the sheet-form material. This sheet-form material can be used as a replacement protective material for pipes, covering material, lining material, fixing material, or the like.

The sheet-form material according to the present invention can be used for producing a layered molding in which a thermoplastic resin sheet and the sheet-form material are laminated, and for producing a layered molding including the sheet-form material as a reinforcing layer of an exisiting molding.

The thermoplastic resin sheet according to the present invention is prepared from polyvinyl chloride, polyethylene, polypropylene, a copolymer thereof, an acrylic resin (such as PMMA or the like), ABS, polystyrene, a polycarbonate resin, a thermoplastic polyurethane resin, AS (acrylonitrile/styrene copolymer), acrylate/vinyl chloride copolymer, or the like, and the thickness thereof is preferably 0.1 to 5 mm.

The sheet-form material according to the present invention is cured to the B stage (or is formed into a prepreg) preferably at 80° C. or less, and the viscosity thereof is increased preferably at the temperature with in a range from ordinary temperature to 50° C., and more preferably from 30° C. to 45° C., to obtain a photocurable fibrous reinforced resin sheet-form material (in the following, which is referred to as "a fibrous reinforced resin sheet-form material") as a prepreg not including a liquid component. In order to mold by laminating the fibrous reinforced resin sheet-form material of which the viscosity is increased, the back side of the thermoplastic resin sheet, heated in advance to the softening temperature, is suitably coated with a primer, onto which the side of the fibrous reinforced resin sheet-form material from which the fixing film is removed is adhered by pressing, or alternatively, a layered molding in which the thermoplastic resin sheet and the fibrous reinforced resin sheet-form material are adhered to each other by pressing in a similar manner at the ordinary temperature is heated to the softening temperature of thermoplastic resin sheet, which is fixed in a vacuum forming mold with the surface of the thermoplastic resin sheet opposed to the mold, followed by being decompressed and being aspirated, or alternatively, by also pressing from the side of the fibrous reinforced resin sheet-form material on the rear surface of the layered molding, so as to form a layered molding into the shape of the mold. After forming, the side of the fibrous reinforced resin sheet-form material is irradiated by ultraviolet rays or visible light so that the sheet is cured.

At this time, the photoirradiation may be carried out with the layered molding on the vacuum forming mold, or may be carried out after removing the layered molding from the mold and solidifying the thermoplastic resin by cooling. The films remaining on the back surface of the fibrous reinforced resin sheet-form material can be left until this operation is finished, provided that they do not prevent the transmission of light and are soft and thin transparent films.

The "pressing" preferably refers to the forming by using a pressure of 0.1 to 10 kg/cm$^2$. In order to laminate the fibrous reinforced resin sheet-form material of which the viscosity is increased and which is formed into a prepreg, the back side of the thermoplastic resin sheet, heated in advance to the softening temperature, is suitably coated with a primer, onto which the side of the fibrous reinforced resin sheet-form material formed into a prepreg, from which the fixing film is removed, is adhered by pressing, or alternatively, a layered molding in which the thermoplastic resin sheet and the fibrous reinforced resin sheet-form material are adhered to each other by pressing in a similar manner at ordinary temperature is heated to the softening temperature of the thermoplastic resin sheet, which is fixed in a forming mold such as a FRP mold or a metal mold, with the surface of the thermoplastic resin sheet opposed to the mold, followed by heating and compressing for forming. After forming, one side of the mold is taken off, so that ultraviolet rays or visible light can be irradiated on the fibrous reinforced resin sheet-form material to be cured. At this time, the photoirradiation may be carried out with the layered molding on the forming mold, or may be carried out after removing the layered molding from the mold and solidifying the thermoplastic resin by cooling.

Although there are no particular limitations imposed on a photoirradiation lamp, a high-pressure mercury-vapor lamp which is commercially available can be preferably used.

The photocurable fibrous reinforced resin sheet-form material according to the present invention has suitable adhesiveness, and is easy to flow under low pressure by heating it to lower the viscosity. Moreover, it has flexibility even at ordinary temperatures, and has the excellent compatibility with the thermoplastic resin sheet. The adhesiveness facilitates the cohesion and the unification with the thermoplastic resin sheet. In spite of the adhesiveness, when the sheet-form material holding film is taken off, no resins remain onto the film, so the workability and the economical efficiency are superior.

Since the sheet-form material is provided in a form in which the sheet-form material is put between the films, it is easy to cut before molding or in laminating, and since it has hardly been exposed to the irradiation of ultraviolet rays, it is convenient.

Various kinds of the fibrous reinforced resin sheet-form material can be produced by altering the kinds of the resin, the additives, or the fibrous reinforcements (d), the content thereof, or the thickness thereof, so it is possible to select a suitable fibrous reinforced resin sheet-form material in accordance with the thickness, the rigidity, or the feeling of the thermoplastic resin sheet or a reinforced composite of a product. The degree of the viscosity increase can be controlled by altering the amount of the polymer (b) added as a viscosity improver for preparing the sheet, and thereby the adhesiveness and the handleability can be changed.

In order to produce a layered molding using the sheet-like material according to the present invention as a reinforcing layer of an existing molding, the fibrous reinforced resin sheet-form material according to the present invention is attached onto the surface (the back) of a molded article by pressing, followed by irradiating ultraviolet rays or visible light onto the surface of the fibrous reinforced resin sheet-form material, and thereby the fibrous reinforced resin sheet-form material is cured as a reinforcing layer.

Provided that the molded article is in a portable form, the molded article may be made of any one of a thermoplastic resin, a thermosetting resin (such as an unsaturated polyester resin, an epoxy resin, a vinyl ester resin, a phenol resin, or the like, or FRP thereof), a metal (such as a rolled steel plate, an ED steel plate, a stainless steel plate, a zinc steel plate, an aluminum steel plate, or the like), an inorganic material (such as a concrete, a glass, a ceramic, a natural stone such as a marble, or the like), a paper, a wood, and the like.

EXAMPLES

Although the present invention will be explained in detail with examples in the following, the present invention is not limited to these examples. In this specification, "part" means "part by weight".

Synthesis Example

Synthesis of Polymer Powders 80 parts of methyl methacrylate were put into a reactor provided with a mixer, into which 1 part of an emulsifying polymer consisting of methyl methacrylate/methacrylate copolymer as an emulsifying agent and 0.1 parts of potassium persulfate as a catalyst were added. After stirring them in 150 parts by weight of water at a polymerization temperature of 80° C. for 180 minutes, polymerization was carried out until reaching a polymerization conversion ratio of 98%. The average particle diameter of obtained latexes is within a range from 0.2 to 0.5 $\mu$m. The obtained latexes were sprayed and dried at 150° C. by spray drying to obtain polymer powders. The weight average molecular weight was 400,000.

Example 1

Prepreg

A mixture including 100 g of methyl methacrylate having a SP of 8.3, which was calculated from the molar attraction constants, and 100 g of neopentyl glycol dimethacrylate having a SP of 8.2 had a SP of 8.3. Into this, 0.5 g of an ultraviolet curing agent (IRGACURE 651 manufactured by Ciba Specialty Chemicals Inc.) were added, and were dissolved by stirring. After that, 40 g of the acrylic polymer powders prepared in the Synthesis Example were added and were stirred. Products were impregnated into a chopped strand mat having an area of 50 cm×30 cm and a density of 450 g/m$^2$. The viscosity of the compound was increased to over 1,000 poise at 25° C. for 20 minutes. The obtained prepreg was coated by a light blocking film and was stored as a sheet-form material.

The material was a transparent solid sheet having a few tucks, and was cured by irradiating ultraviolet rays for only 5 seconds by means of an ultraviolet lamp.

Example 2

Prepreg

A mixture icluding 100 g of methyl methacrylate having a SP of 8.3, which was calculated from the molar attraction constants, 50 g of neopentyl glycol dimethacrylate having a SP of 8.2, and 50 g of isobornyl methacrylate having a SP of 7.9 has a SP of 8.18. Into this, 0.5 g of an ultraviolet curing agent (IRGACURE 651 manufactured by Ciba Specialty Chemicals Inc.) were added, and were dissolved by stirring. After this, 40 g of acrylic polymer powders prepared in the Synthesis Example were further added and were stirred. Products were impregnated into a chopped strand mat having an area of 50 cm×30 cm and a density of 450 g/m$^2$. The viscosity of the compound was increased to over 1,000 poise at 25° C. for 20 minutes. The obtained sheet-form material (prepreg) was coated by light blocking films and was stored. The obtained sheet-form material was transparent.

The material was cured by merely irradiating ultraviolet rays for 5 seconds by means of an ultraviolet lamp.

Example 3

Prepreg

After preparing a mixture (of which the SP value is 8.4) including 200 g of unsaturated polyester resins containing 80 g of styrene (POLYLITE FR-200: manufactured by Dainippon Ink and Chemicals, Inc.) and 20 g of methyl methacrylate, 0.5 g of an ultraviolet curing agent (IRGACURE 651 manufactured by Ciba Specialty Chemicals Inc.) were added and were dissolved by stirring. After this, 40 g of acrylic polymer powders prepared in the Synthesis Example were added and were stirred. Products were impregnated into a chopped strand mat having an area of 50 cm×30 cm and a density of 450 g/m$^2$. The viscosity of the compound was increased to over 1,000 poise at 25° C. for 20 minutes. The obtained molded material was coated by light blocking films and was stored.

The prepreg was cured by merely irradiating ultraviolet rays for 10 seconds by means of an ultraviolet lamp.

Example 4

Vinyl Ester Prepreg

A photocurable sheet-form material was prepared in a manner identical to Example 3, except that vinyl ester resin synthesized from 1 mole of bisphenol A and 2 moles of methacrylic acid was used instead of the unsaturated polyester resin. The viscosity of the compound stirred for one minute was 100 poise or less, and the visocosity of the compound stirred for 10 minutes was 1,000 poise. The obtained sheet was coated by aluminized light blocking films and was heated at 40° C. for 5 minutes, to obtain a prepreg sheet having excellent handleability. The obtained sheet-form material was transparent, and was cured by irradiating ultraviolet rays for 8 seconds by means of an ultraviolet lamp.

Comparative Example 1

Prepreg 0.5 g of an ultraviolet curing agent (IRGACURE 651) were added into 200 g of isobornyl methacrylate having a SP of 7.9, which was calculated from the molar attraction constants, and were dissolved by stirring. After this, 40 g of acrylic polymer powders prepared in the Synthesis Example were added and were stirring. Although products were impregnated into a chopped strand mat having an area of 50 cm×30 cm and a density of 450 g/m$^2$, the viscosity of the compound was barely increased at 45° C., and the compound could not be used as a prepreg.

Example 5

The sheet-form material (prepreg) prepared in Example 3 was laminated onto a sheet of polymethyl methacrylate having a thickness of 3 mm, was prresed by a roller to attach the sheet-form material with the sheet, and then, was cut into a determined size. After this layered material was heated by leaving it in an air bath at 150° C. for 5 minutes, it was put on a mold made of FRP in such an arrangement that the polymethyl methacrylate side of the layered material was opposed to the mold, and then was aspirated from a hole of the mold at 30 mmHg. In order to sufficiently form the layered material into a desirable form, an iron cover having a hole at the middle portion was put over the mold, and was pressed at 5 kg/cm$^2$. After formation was complete, the cover was removed, the sheet-form material (prepreg) with releasing films was irradiated for 20 minutes by means of a sun lamp SSL250A (manufactured by Stanley Electric Co., Ltd.), and the cured layered molding was removed from the mold. The degrees of curing and attachment between layers were sufficient.

Example 6

A bulk molding compound prepared by increasing the viscosity of a compound including 100 parts by weight of a polyester resin (propylene glycol/fumaric acid), 200 parts by weight of calcium carbonate, 2 parts by weight of zinc stearate as an inner releasing agent, 2 parts by weight of magnesium oxide, and 5 parts by weight of glass fibers in ½ inch lengths as a fibrous reinforcement, 2 parts by weight of perbutyl O(a curing agent manufactured by Nippon Oil & Fats Co., Ltd.) was heated to 125° C. for 10 minutes, and was compressed at 80 kg/cm$^2$ to produce a bath molding having a thickness of 5 mm.

After applying DIOVAR-CP-700 (vinyl ester resin manufactured by Dainippon Ink and Chemicals, Inc.) as a primer onto a bottom portion and corner portions of the bath molding, releasing films taken off from one side of the sheet-form materials (prepregs) prepared in Example 4 were attached thereon by pressing by means of a roller. Next, the prepreg surface attaching releasing films left on another side was irradiated for 20 minutes by means of a sun lamp SSL250A (manufactured by Stanley Electric Co., Ltd.), to obtain a bath molding having a reinforcing layer. The degrees of curing and attachment between layers were sufficient.

INDUSTRIAL APPLICABILITY

According to the present invention, by including components (a), (b), (c), and (d), a sheet-form material having excellent productivity, handleability, and photocurability can be produced. The sheet-form material can be used to produce a layered molding and a back-up layer (a reinforcing layer) of a molded article, and is useful as a replacement protective material for pipes, covering material, lining material, fixing material, or the like.

What is claimed is:

1. A photocurable sheet-form material comprising:
   (a) a polymerizable unsaturated monomer;
   (b) a polymer which is either polymethyl methacrylate or a polymer consisting mainly of methyl methacrylate units and which is compatible or swollen with the monomer (a), wherein the polymer (b) is produced in a powdered form having a weight average molecular weight of 100,000 or more, and wherein the particle diameter of the polymer (b) is 300 to 5000 Angstroms (Å);
   (c) a photocuring agent;
   (d) fibrous reinforcement; and
   (e) one or more resins selected from a (meth)acrylic polymer, an unsaturated polyester, a vinyl ester, or an urethane acrylate;
   wherein, the polymerizable unsaturated monomer (a) is an acrylic polymerizable monomer, and has a solubility parameter SP within a range from 8.1 to 10.0, which is calculated in accordance with a formula "SP=$\Sigma(G)$/molecular weight" by using molar attraction constants G,
   a content of the polymer (b) is within a range from 10 to 50 parts by weight, relative to 100 parts by weight of the polymerizable unsaturated monomer (a), and
   the polymer (b) is produced in an emulsion form by an emulsion polymerization method.

2. A photocurable sheet-form material according to claim 1, wherein the polymer (b) is included in an amount of 1 to 100 parts by weight, relative to 100 parts by weight of the polymerizable unsaturated monomer (a).

3. A layered molding made of a laminate of a thermoplastic resin sheet and a photocurable sheet-form material according to claim 1.

4. A method of reinforcement, including a step of using a photocurable sheet-form material according to claim 1 on a surface of a molded article.

* * * * *